United States Patent [19]

Grossi

[11] Patent Number: 4,491,063

[45] Date of Patent: Jan. 1, 1985

[54] DEVICE FOR THE WATER FEEDING AND FOR THE FILTERING OF THE COFFEE INFUSION IN COFFEE-MACHINES PARTICULARLY OF AUTOMATIC TYPE

[76] Inventor: Lucio Grossi, Mazzini St., 29, Bergamo, Italy

[21] Appl. No.: 437,743

[22] Filed: Oct. 29, 1982

[30] Foreign Application Priority Data

Nov. 4, 1981 [IT] Italy .............................. 24844 A/81

[51] Int. Cl.³ .............................................. A47J 31/00
[52] U.S. Cl. ................................. 99/289 R; 99/312 R
[58] Field of Search ....................... 99/289 R, 297, 300, 99/302 R, 302 P, 307; 426/433

[56] References Cited

U.S. PATENT DOCUMENTS

| | | | |
|---|---|---|---|
| 2,939,380 | 6/1960 | Parraga | 99/289 R |
| 4,188,863 | 2/1980 | Grossi | 99/289 R |

FOREIGN PATENT DOCUMENTS

| | | | |
|---|---|---|---|
| 0468687 | 1/1952 | Italy | 99/297 |
| 0578434 | 6/1958 | Italy | 99/297 |
| 0384164 | 1/1965 | Switzerland | 99/302 P |
| 0007847 | of 1893 | United Kingdom | 99/297 |

*Primary Examiner*—Harvey C. Hornsby
*Attorney, Agent, or Firm*—Bucknam and Archer

[57] ABSTRACT

The device relates to the distribution under pressure of the hot water coming from a tank, boiler or the like in a coffee-machine and the delivering of the water itself to the chamber where the coffee powder is contained, as well as the filtering of the infusion obtained by the passing of the hot water through the coffee powder as far as the coming out of the infusion itself. The device allows to avoid the clogging of the inlet holes of the hot water into the chamber containing the coffee powder and the clogging or the variation of the holes of the usual filters through which the infusion passes so that the total passing surface of the infusion for filtering remains constant in the time. For filtering the infusion, the device provides a solid disk having a central hole the outer diameter of which is smaller than the diameter of the chamber containing the coffee powder and the inner diameter is partially closed, the whole so that in all the infuse passing port is equivalent to what is considered the optimum surface of the usual filters, which is formed by the addition of all the surfaces of the single passing holes through the filter. The infusion water is then let into the chamber containing the coffee powder, passes through the same and comes out from the circular peripheral and central crowns laying between the disk and the containing chamber, coming out from the outlet holes of the unit.

3 Claims, 3 Drawing Figures

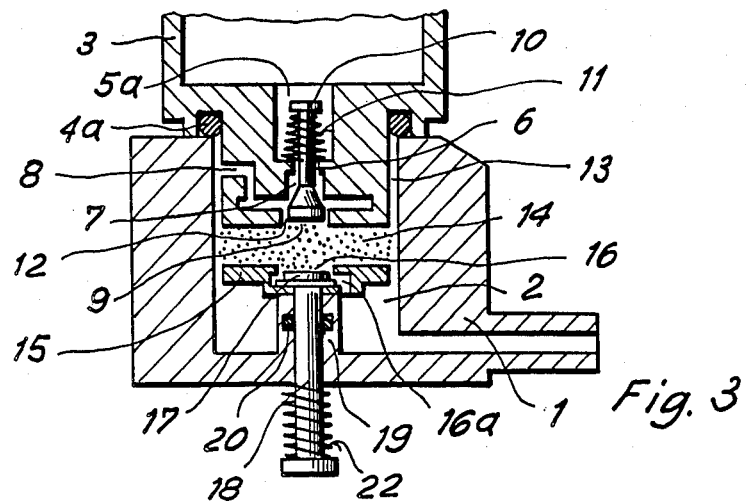
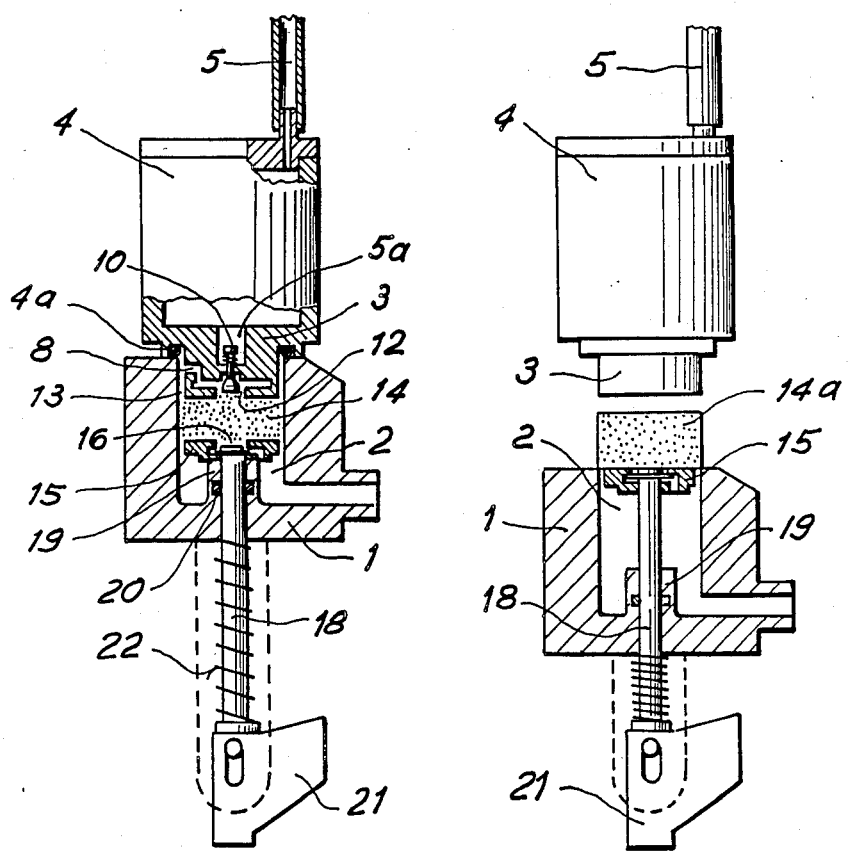

4,491,063

DEVICE FOR THE WATER FEEDING AND FOR THE FILTERING OF THE COFFEE INFUSION IN COFFEE-MACHINES PARTICULARLY OF AUTOMATIC TYPE

The present invention relates to a device for making the coffee infusion in coffee-machines particularly of automatic type comprising means for the inlet of the hot water into the chamber containing the coffee powder (which will be hereinafter called delivering chamber) and means for the coming out of the coffee infusion obtained by the passing of the hot water through the coffee powder. These means consist of annular passing ports realized between the lateral wall of the piston and the wall of the delivering chamber and on the end of the piston (fed by appropriate ducts) and between the wall of the delivering chamber and the outer rim of a disk as well as in the middle of the disk respectively, the means being situated in the upper and lower areas of said delivering chamber respectively.

The annular passing ports, which are present on the piston and on the disk (called filtering disk) respectively are such as to produce passing surfaces which are considered as the optimum in order to obtain a correct infusion of the coffee powder.

As it is known, the relevant development achieved by the coffee-machines particularly of automatic type with which very numerous types of coffee are distributed also in a short time or which are not used for a long time, has brought considerable problems concerning the attending, the setup and the maintenance of the machines themselves from skilled personnel not being usually at disposal of the user.

One of the most delicate points of this maintenance consists of the fact that it is necessary to keep constant and unchanged the working conditions of the machine when these working conditions are the best possible ones foreseen by the manufacturer in order to keep constant the quality of the delivered coffee.

Usual coffee-machines are equipped with infusion passing filters provided with small holes having a some tenth millimeter diameter, which tend, with the use of the machine, to be clogged both by the deposit of salts contained in the water and by the deposit of hard or tarry substances contained in and deriving from the coffee itself.

Likewise the inlet holes for the water into the delivering chamber containing the coffee powder are usually reduce both by the presence of calcareous foulings which form along the rims of the hole and by the presence of tarry deposits deriving from the components of the coffee itself. These deposits cause a phenomenon which can be noticed in any coffee-machine and which appears in a constant form depending on the use of the machine itself.

At the beginning, when the machine is newly set-up or newly manufactured, it does not produce good quality coffee infusions, but it generally produces coffees in which the passing of the water through the coffee powder is very quick with a consequent scarce exploitation of the powder itself. This is due to the fact that the passing holes both for the feeding of the water and for the filtering of the infusion are of the largest possible dimension, namely that one of manufacture, and they are still not in any way subjected to reduction.

With the use of the machine the passing dimensions of the holes are more and more reduced by several deposits and it happens at a certain point that the holes of the filter reach an optimum dimension according to which the water is kept in contact with the coffee powder for the correct time, so allowing an exploitation of the substances of the coffee that the beverage is considered as an excellent quality one.

With continued use the machine, the dimensions of the holes of the filter continue to narrow so that the total passing surface of the infusion becomes scarce and the direct consequence is that one has an inferior quality coffee, in particular without cream.

At this point it is necessary that the replacement of the filters and the cleaning of the passages of the hot water be made with a considerable loss of time without considering that these machines, generally of automatic type, are located in places far from each other as for example in factories, offices, houses, etc. and it becomes extremely burdensome to have to call the places in which various machines are used in order to replace the damaged parts. On the other hand, it is also very difficult for the user to establish the moment in which the filters must be replaced, this depending on many factors so that an automatic machine set-up at a community, a factory or the like can correctly work only for a short period of time, namely from the starting period in which the coffee is less good owing to the excessive passing bf the water to the last period in which it becomes as much undesirable for the opposite reason, namely owing to the scarce passing of the water.

The device subject of the present invention totally eliminates these disadvantages maintaining constant in time both the delivering surface of the hot water and the filtering surface of the coffee infusion, so that both at the beginning of the working of the machine and after an indefinite working period these surfaces remain exactly the initial ones which were foreseen by the manufacturer for optimum performance, the surfaces being automatically maintained constant through the use itself of the machine so that no maintenance is required for its correct working. According to the invention the device comprises a cylindrical delivering chamber having a constant diameter in which the coffee powder at the loose stage is brought in and a compressing piston which enters the delivering chamber so as to compress the coffee powder which was brought in and so that the desired compactedness be reached. The feeding of the hot water under pressure to the compressed coffee powder takes place through an annular port formed between the lateral surface of the coffee powder compressing piston and that one of the delivering chamber as well as through the hollow space existing between a hole situated on the end of the piston and a shutting element sliding in the interior of it. Below the coffee powder is provided a disk having filtering purpose which presents a central hole in which a shutting element leaving a hollow space slides, the disk having, besides, a little smaller diameter than the inner diameter of the delivering chamber, the difference of diameter and the hollow space being such as to form two circular crowns open to the passing of the coffee infusion, having a total surface equivalent to the optimum surface foreseen in order to obtain the desired infusion, the filtering disk being movable axially to be lifted at the end of the coffee delivery for the ejection of the exhausted powder. This axial movement takes place together with the sliding of the shutting element in the hole obtained in the disk so that sliding motions are produced between the walls of the hole and of the delivering chamber for their cleaning, returning then to a lowered position to allow a new bringing in of the coffee powder and the repetition of the delivering cycle.

According to the invention the shutting element inside the piston is integral to a nonreturn valve apt to be opened by the pressure of the water to be delivered when it attains a suitable value and furthermore the dimensions of the hollow spaces between the piston and the delivering chamber, the hole of the piston and the shutting element of the delivering valve, the outer circumference of the disk and the delivering chamber, the shutting element and the hole of the disk, are such as not to allow the passing of the coffee powder into the infusion in relation to the average granulometry provided for by the used milled, except for inevitable traces of very fine powder, the total passing surface of the infusion, equivalent to the optimum required, being attainable by varying the inner diameter of the delivering chamber and/or the outer diameter and/or that one of the hole and of the corresponding shutting element of the disk having a filtering purpose. For the working, at the time of the bringing of the hot water into the delivering chamber, the coffee powder is already compressed by the axial movement of the piston and therefore the water is distributed along the whole surface of the piston and sinks the tablet formed by the compressed coffee powder, it passes through the same and comes out through the open circular crowns situated between the disk, the wall of the delivering chamber and in the middle of the disk to come out as an infusion through the outlet hole. At the end of the delivery of the infusion, the piston which produced the compression of the coffee powder and the inlet of the hot water is extracted while the disk of the lower filter is lifted for the ejection of the coffee grounds tablet remained after the delivery. The lifting allows the disk itself and the coffee powder tablet to clean the walls of the delivering chamber. The shutting element of the hole which delimits the central port is constrained to the lifting pin and it thus makes a sliding movement limited with respect to the disk, which provides to keep clean the walls of the annular port. During the reversal of the disk to the working position, the walls of the delivering chamber and the walls of the disk itself and the central annular port are further on cleaned thus maintaining constant the distance between the same and therefore the coffee infusion passing surface.

These and other features will result evident from the detailed specification of an embodiment of the device according to the invention applied to an automatic machine for the coffee production, which is illustrated in the enclosed figures in which:

FIG. 1 is the detail of the delivering unit in the working condition for the production of the coffee beverage and FIG. 2 is the same unit in the condition of ejection of the already exhausted coffee grounds tablet and FIG. 3 is an enlarged particular of FIG. 1 including the end of the piston and the filtering disk.

With reference to FIGS. 1 and 3 the coffee production unit consists of a body 1 having a cylindrical hollow 2, which has been called delivering chamber, in which enters a piston 3 of a feeding unit 4 of the water under pressure coming in any known manner from a duct 5 and which arrives at the inner hollow 5a such as to pass, under pressure, through the gauged neck 6 into the small chamber 7 inside the piston 3. The small chamber 7 is provided with a duct 8 which opens on the lateral wall of the piston 3 and with a hole 9, having a circular section, which opens on the frontal wall of the piston 3. The duct 8 and the hole 9 are shut with respect to the small chamber 7 by the nonreturn valve 10 pressed by the spring 11.

Port 12 is the open space present between the hole 9 and the lower end of the shutting element of the valve 10. The hollow space between the piston 3 and the cylinder 1 sealing in 4a, into which flows the duct 8, constitutes the port 13. The dimensions of the ports 12 and 13 are such as the coffee powder, of the usually used granulometry, can not enter inside the piston 3.

In FIGS. 1 and 3 it is noted that the coffee powder 14 lays on a disk 15 which is compressed by the piston 3 when it is lowered until the foreseen compactedness of the coffee powder is obtained.

The disk 15 consists of a solid disk which is provided with a central hole 16 in which the shutting element 17 placed at the end of the pin 18 slides. Between the hole 16 and the shutting element 17 there is a hollow space, which communicates with the rear part of the disk 15 through the duct 16a. According to the invention the peripheral diameter of the disk 15 is smaller than the diameter of the delivering chamber 2 and the shutting element 17 has a smaller diameter than that one of the hole 16, the values being such that the respective open areas, available for the passing of the liquid, on the whole correspond to the desired area for the optimum obtaining of the coffee beverage.

The hollow spaces must be such as to be smaller than the minimum granulometry foreseen for the coffee powder.

With reference to FIG. 2 there is the same unit shown in FIG. 1 at the ejection stage of the coffee grounds tablet 14a and the same elements are shown with the same references pointing out that the disk 15 is supported by the pin 18 sliding inside the bottom of the block of the body 1 in a support 19 provided with appropriate sealing members 20 and the disk 15 can be lifted through known means, for example by means of a cam or the like 21. A spring 22 repositions the disk 15 after the ejection of the exhausted tablet 14a.

In FIG. 2 the compressing piston 3 is completely extracted from the body 1 and the disk 15 has been lifted by the cam 21 to the upper outlet level from the body 1.

When the exhausted coffee powder tablet 14a is at the upper level, it can be extracted in any manner.

The working is the following:

Having brought the coffee powder 14 into the delivering hollow 2 and having lowered the piston 3 until the required compression of the coffee powder pressed between the frontal surface of the piston 3 and the disk 15 is obtained, the hot water under pressure, fed by the pipe 5, passes through the hole 6 overcoming the action of the valve 10 pressed by the spring 11 and through the lateral duct 8, the port 13 and the port 12, is delivered out of the piston 3 and is distributed on the coffee powder under. When the infusion is already partially obtained, it is pushed to pass through the crown between the disk 15 and the chamber 2 and the crown between the hole 16 and the shutting element 17, which, offering a certain resistance to the passing due to the inflow capacity section let open, operate so that the outlet of the infusion takes place with the proper graduality as it was foreseen by the manufacturer through the arrangement of the dimensions of the passing surfaces let between the walls.

With reference to FIG. 2 it is noted the stage subsequent to the delivering of the infusion of the beverage in which the disk 15 has been lifted by the cam 21 and the coffee grounds tablet 14a is ready for the ejection. During this movement the disk 15 makes an axial stroke and pushing upwardly the compact grounds tablet 14a cleans the inner walls of the delivering chamber 2 eliminating any fowling and any calcareous deposit. It is so obtained the automatic cleaning of each coffee delivery of the parts which could be damaged owing to the fowlings of gummy or resisting deposits, deriving from the coffee powder or from the water and to thus maintain constant the quality of the delivered beverage.

It is understood that numerous variants may be brought to what above described and illustrated particularly with regard to the type of coffee-machine to which the delivering device and filter should be applied. In particular it may be foreseen changes in the arrangement of the delivering unit 1 as well as in the feeding system of the water under pressure, without therefore exceeding the limits of the present invention. For example the water feeding can take place in the unit 4 from the duct 5 without being under pressure and inside the unit itself it can be foreseen in a known manner a sliding piston provided with a valve such as to compress the water which was brought in from said pipe 5 to the desired pressure. Again in a known manner the feeding water can be brought to the desired pressure outside the unit and then brought in a known manner inside the unit 4 when it is required for the delivery of the infusion.

I claim:

1. A device for feeding water and for filtering of a coffee infusion in coffee-machines, particularly of automatic type, which comprises a cylindrical delivering chamber for coffee powder (1, 2), a compressing piston (3) entering said cylindrical delivering chamber for compressing the coffee powder, a cylindrical shutting valve (10) sliding in the interior of the piston, the feeding of hot water under pressure to the compressed coffee powder taking place through an annular port formed between a lateral surface of the coffee powder compressing piston and a surface of the cylindrical delivering chamber as well as through a hollow space existing between a hole situated on the end of said piston and said cylindrical shutting valve, a disk (15) provided with a central opening (9), said central opening being the only opening therein and in which a shutting element (17) slides, said disk having a little smaller diameter than the inner diameter of the delivering chamber, said difference of diameter and another hollow space between said shutting element and said disk being such as to form two circular crowns open to the passing of the coffee infusion, having a total surface equivalent to the predetermined optimum surface in order to obtain the desired infusion, said filtering disk being movable axially to be lifted at the end of the coffee delivery for the ejection of the exhausted powder, the axial movement taking place together with the sliding of said shutting element in said opening in said disk so that sliding motions are produced along the walls of said opening and of said delivering cylindrical chamber for their cleaning, said disk being movable to a lowered position to allow a new bringing in of the coffee powder and the repetition of the delivering cycle.

2. A device according to claim 1, wherein said shutting valve in said piston comprises a non-return valve (10) apt to be opened by the pressure of the water to be delivered when it attains a suitable value.

3. A device according to claim 1, wherein the maximum dimensions of the hollow spaces between the piston and the delivering chamber, the hole of the piston, the outer circumference of the disk and the delivering chamber, the shutting element and the hole of the filtering disk, are such as not to allow the passing of the coffee powder into the infusion except for inevitable traces of very fine powder, said total passing surface of the infusion, equivalent to the optimum required, being attainable by varying the inner diameter of the delivering chamber and/or the outer diameter of said disk and/or the inner diameter of said disk and the outer diameter of the corresponding shutting element of said disk.

* * * * *